Dec. 28, 1965     M. C. SICARD     3,225,929
CLOSURE MEANS FOR FILTER CONTAINING PRESSURE VESSELS
Filed Oct. 11, 1961     2 Sheets—Sheet 2
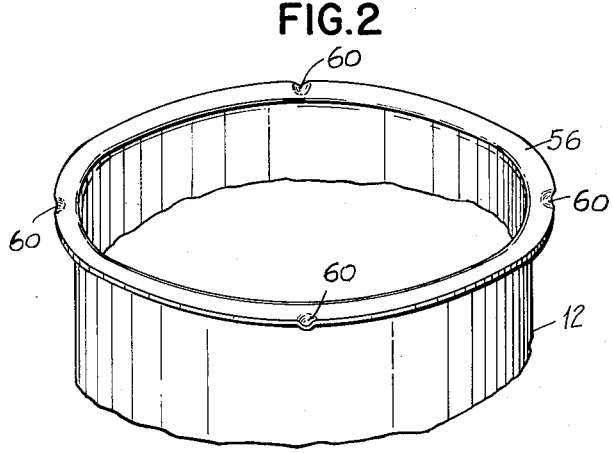
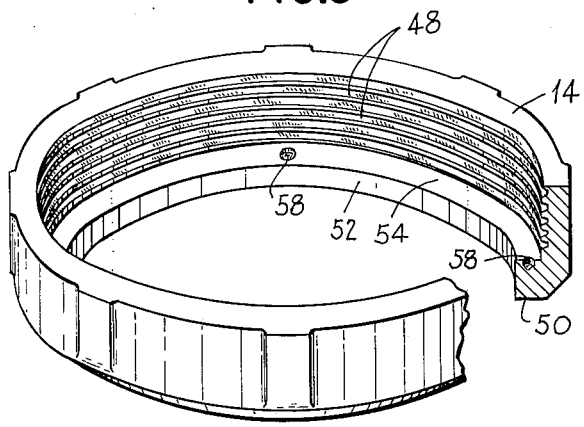
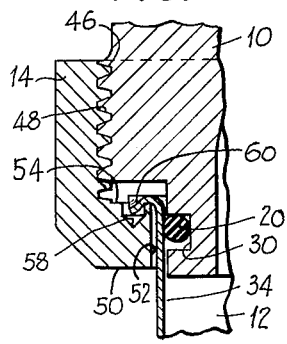
INVENTOR
MARCEL CLARENCE SICARD
BY
ATTORNEY

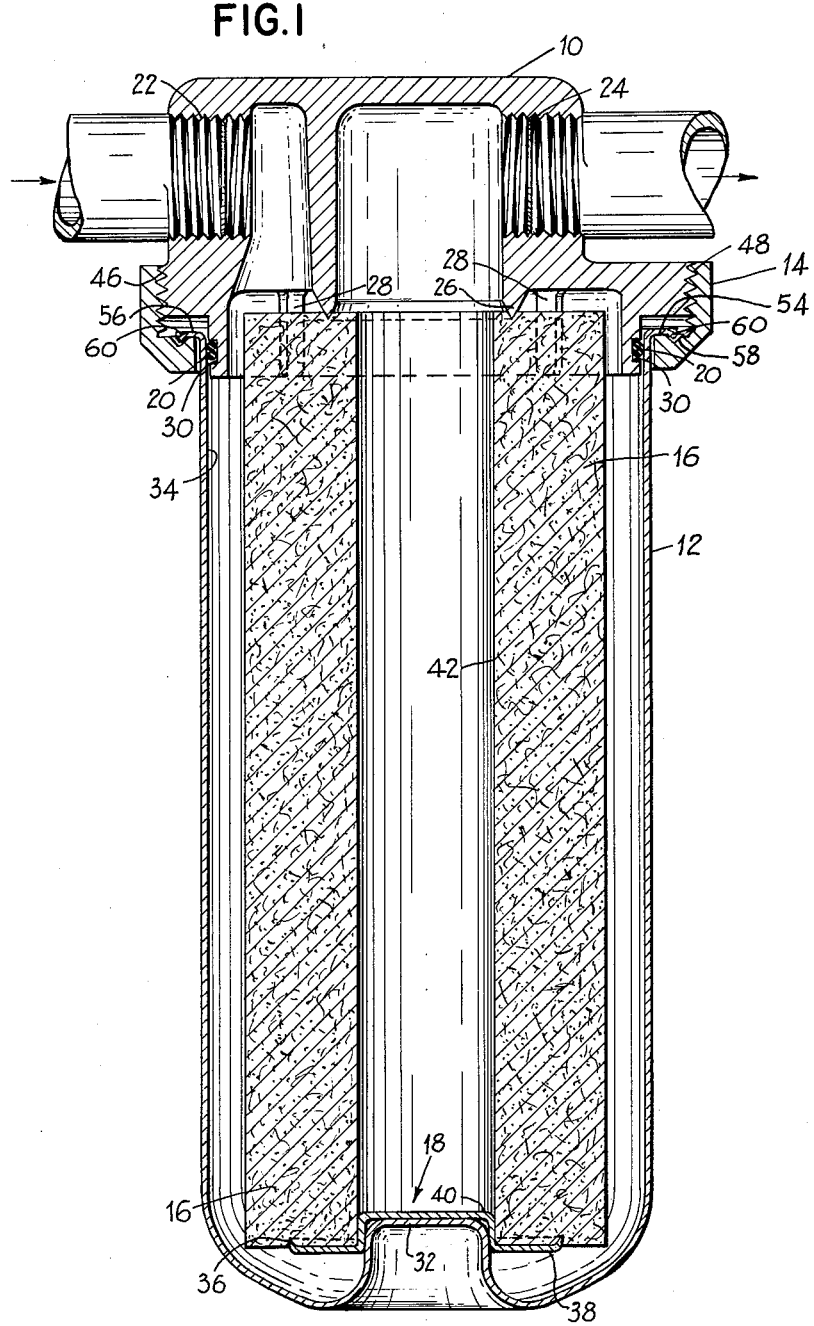

3,225,929
CLOSURE MEANS FOR FILTER CONTAINING PRESSURE VESSELS

Marcel Clarence Sicard, Cheshire, Conn., assignor to American Machine & Foundry Company, a corporation of New Jersey
Filed Oct. 11, 1961, Ser. No. 144,472
2 Claims. (Cl. 210—232)

This invention relates to pressure vessels and, in the embodiment disclosed, to filters for fluids.

Pressure vessels commonly employ a flanged and bolted joint between the vessel proper and its closing member. These joints at best are bulky and expensive and consequently, for light duty at least, some form of union joint is often used in which a flanged shell is attached to its closure by a threaded ring. Because of their usually rather light construction, troubles frequently attend the use of such rings as they are too narrow to afford a good handgrip, and they are easily deformed by the use of pipe wrenches.

Accordingly, it is an object of the present invention to afford an improved union joint which may more readily be assembled and disassembled than those of the prior art.

Another object is to provide a simple self-locking joint which resists accidental loosening under conditions of pressure and vibration that would ordinarily call for additional locking devices.

Yet another object is to provide a union joint of simple construction, easily manipulated by unskilled labor, which has auto-locking characteristics and which is also inexpensive to manufacture and maintain.

A further object is to so construct a filter housing that the inherent resilience of the filtering element carried therein aids in locking the joint between the head and sump even when unpressurized.

Further objects will be apparent when perusing the descriptive matter, claims and drawings which follow.

Referring to the drawings:

FIG. 1 is a sectioned side elevation of a fluid filter embodying the invention;

FIG. 2 is a perspective view of a part of the sump of the filter of FIG. 1;

FIG. 3 is a perspective view of the ring nut, partly broken away to show certain details;

FIG. 4 is an enlarged section view of part of the head, sump, etc. showing their working relationship.

FIG. 1 shows the organization of a filter having a cap or head 10; a housing or sump 12; a retaining ring or nut 14; a filter element 16; a sealing plate 18 and an "O" ring serving as a seal 20. The head 10 has an inlet passage 22, an outlet passage 24 and an annular projection 26 adapted for crush-sealing engagement with the filter element 16 which is centered in the head by a plurality of ribs 28. A smoothly surfaced groove 30 serves to house the "O" ring 20 which is pinched between surfaces of the groove and the inner wall 34 of the sump 12, in pressure sealing relationship. The sealing plate 18 lies on a pedestal 32 formed on the concave bottom surface of the sump and supports the element 16 and has sealing engagement therewith by virtue of upturned edge 36 of flange 38 crushingly engaging the filter element, which is centered on the sealing plate by engagement of the wall of central cavity 42 with hub 40.

Force applied axially of the sump 12 in the direction of the head 10 will cause the plate 18 to slip to an approximately central position on the pedestal 32 at the bottom of sump 12 and will cause annular projection 26 and edge 36 to crush-seal the ends of the filter element 16. Referring to FIG. 3, it will be seen that nut 14 has screw threads 48 suited for engagement with the threads 46 of head 10; it also has a radially inwardly directed flange 50 having a bore 52 sized to pass over the body of the sump 12 while its thrust face 54 is suited for engagement with flange 56 which is an integral part of the sump. The above mentioned axially oriented force may be furnished by this arrangement.

What has been described above is a filter of the known type generally similar to that disclosed in U.S. Patent 2,966,990, but having the sump attached to the head by a union nut. The junction thus formed permits axial movement of the sump relative to the head to effect the crush-sealing of the ends of the filter element.

According to the present invention, the thrust face 54 has a number of interruptions 58 (four, in the construction here described) substantially equally spaced and adapted to receive small projections 60 which are stuck in the flange 56. In such a joint embodying the invention and having a flange 56 of about 3¾" diameter, the interruptions are simple ⅛" diameter holes about ³⁄₆₄" deep and the projections are small "bumps" about ³⁄₃₂" wide by ¹⁄₃₂" high and shaped to enter into a ⅛" diameter hole and to afford detent like engagement of the sump 12 with the nut 14 as is clearly shown in FIG. 4.

On assembly of the filter, the nut 14 is screwed on to the head 10 by hand until the resilience of the filter element 16, as it comes under axial loading, permits the detent like engagement of the projections 60 with the holes or interruptions 58. Hereafter the sump may be grasped (using both hands if desired) and turned relative to the head 10 and in being so turned will carry the nut with it. In the case of the filter construction here disclosed, such simple manual turning may be continued until the projection 26 and edge 36 have performed their crush-sealing function, whereafter further tightening will be difficult on account of the element's resistance to further distortion. In any event, after being hand tightened as much as is convenient, the filter may be pressurized whereon the "O" ring will be firmly pressed into engagement with both sump 12 and head 10 and prevent their relative rotation which, because of the inter-engagement of the projections 60 with the interruptions 58, will prevent further rotation of the nut 14. Should the assembly be pressurized without the detent like engagement occuring, the sump will be forced axially away from the head until its projections 60 engage the thrust face 54. If the nut 14 is then turned in either direction, it will only go so far as is needed to align the interruptions with the projections, at which time they will be engaged by the sump being moved by pressure away from the head. This will accomplish the interlocking function and prevent further rotation of the nut. The locking is very positive as it is necessary for the sump to move toward the head to disengage the projections from the interruptions and such movement is resisted by pressure in the sump. It should be noted that the projections or interruptions should preferably have sloping cam-like faces so as to afford detent like engagement and not positive locking engagement so as to facilitate handling.

While the invention has been disclosed as it would most conveniently be applied to a filter, it is obviously applicable to other pressure vessels or to other constructions, as for example, as a lock on a fire nozzle coupling or on other pressurized piping systems.

I claim:

1. A pressure container enclosing a filter element, comprising a head and a sump, one of which has a screw thread and the other a flanged edge respectively, said element having one end engaging said head and the other end engaging said sump, one end of said element being rotatable relative to said sump, whereby said element may be fixed within said container, a closure nut for sealing said head and sump, said nut being threaded to engage said screw thread and having a flange to engage said first mentioned flange, said first mentioned flange and said nut flange having interlocking means for causing positive engagement therebetween and conjoint rotation of the flanged member and said nut during closure and opening of said container.

2. The container defined in claim 1 wherein the interlocking means comprise mutually engageable protrusions and depressions in the mating faces of the flanges.

References Cited by the Examiner
UNITED STATES PATENTS

| | | | |
|---|---|---|---|
| 2,332,459 | 10/1943 | Muney et al. | 220—39 X |
| 2,731,153 | 1/1956 | Kennedy | 210—444 X |
| 2,771,156 | 11/1956 | Kasten et al. | 210—444 X |

REUBEN FRIEDMAN, *Primary Examiner.*

HERBERT L. MARTIN, *Examiner.*